United States Patent [19]
Kawaguchi et al.

[11] Patent Number: 4,648,131
[45] Date of Patent: Mar. 3, 1987

[54] WORK HELMET HAVING TRANSMITTER-RECEIVER FOR LIGHT SIGNAL

[75] Inventors: Toshiyuki Kawaguchi, Inuyama; Hiroyuki Katsukawa, Aichi; Kazumi Nakanishi, Inuyama; Naoki Tanaka, Nagoya, all of Japan

[73] Assignee: NGK Insulators, Ltd., Nagoya, Japan

[21] Appl. No.: 657,533

[22] Filed: Oct. 4, 1984

[30] Foreign Application Priority Data

Oct. 7, 1983 [JP] Japan ................. 58-188931

[51] Int. Cl.$^4$ .............................. H04B 9/00
[52] U.S. Cl. ........................ 455/606; 2/410; 340/573
[58] Field of Search ............ 455/89, 606, 607; 340/825.44, 825.48, 825.72, 825.73, 531, 572, 573; 2/5, 6, 410

[56] References Cited

U.S. PATENT DOCUMENTS

| 3,098,220 | 7/1963 | De Graaf | 340/825.48 |
| 3,122,847 | 3/1964 | Redfield et al. | 455/89 |
| 3,478,344 | 11/1969 | Schwitzgebel et al. | 340/825.44 |
| 4,025,194 | 5/1977 | Teppo | 455/600 |
| 4,110,741 | 8/1978 | Hubert et al. | 340/573 |
| 4,227,577 | 10/1980 | Iida | 340/573 |
| 4,468,656 | 8/1984 | Clifford et al. | 340/539 |

FOREIGN PATENT DOCUMENTS

| 936921 | 11/1973 | Canada | 455/89 |
| 2431937 | 1/1976 | Fed. Rep. of Germany | 455/607 |
| 333562 | 12/1958 | Switzerland | 455/600 |
| 2103043 | 2/1983 | United Kingdom | 455/607 |

Primary Examiner—Joseph A. Orsino, Jr.
Attorney, Agent, or Firm—Parkhurst & Oliff

[57] ABSTRACT

A work helmet for effecting an intercommunication between workers as well as between a central control room and respective workers, especially used for informing each workers of guide information adequate for emergency escape when a disaster occurs is disclosed. To this end, the work helmet includes a light-receiving element for receiving a light signal modulated with the guide information, an earphone for reproducing audibly the guide information, a light emitting element for emitting an outgoing light signal modulated with a speech signal supplied from a microphone, and an oscillator for generating a carrier having a frequency specific to the helmet, on which carrier said speech signal is modulated, so that the outgoing light signal is always modulated by the carrier serving as a helmet identifying signal by means of which the central control room can recognize and identify the worker wearing the helmet.

10 Claims, 6 Drawing Figures

FIG_4

WORK HELMET HAVING TRANSMITTER-RECEIVER FOR LIGHT SIGNAL

BACKGROUND OF THE INVENTION

The present invention relates to a work helmet having a transmitter-receiver which is used for effecting an intercommunication between workers who are engaged in various works such as inspection examination and repair inside a specific construction.

Among various kinds of known work helmets for workers who work in a construction such as underground substation, underground market and building, there has been proposed a work helmet having a wireless communication device installed therein for carrying out an intercommunication between workers and sometimes between a central control room and respective workers. To this end, a conductor serving as an antenna is usually extended between the control room and various places inside the construction so as to transmit information in the form of the electromagnetic wave between the helmet and conductor. However, the electromagnetic wave is liable to be affected by interference and therefore the information signal having a high S/N could not be obtained.

In addition, the known work helmet with the wireless communication device is not sufficiently useful for effecting emergency intercommunication between the central control room and respective workers upon the occurrence of disaster such as fire. This is due to the fact that in the known work helmet as long as the worker wearing the helmet does not send his message to the control room, the control room could not know his position and even his existence in the construction. Therefore, it is not possible to inform the worker of any guide information adequate for the emergency escape upon the disaster. Furthermore, in order to transmit from the control room to respective workers much more useful information, it is preferable that the control room can identify respective workers as well as positions or sections in the construction of particular workers. For instance, if the control room can grasp the position at which a worker situates without receiving any message from him, the control room will be able to send the most adequate message to him.

SUMMARY OF THE INVENTION

The present invention has for its object to provide a work helmet which can perform stably an intercommunication between workers as well as between a central control room and respective workers without being affected by interference, and further which can always send to the central control room a signal representing at least an existence of worker, so that the control room can recognize at least an existence of the worker without receiving any message from the worker, thereby the worker can receive from the central control room guide information adequate for emergency escape.

It is another object of the invention to provide a work helmet which can always send to the central control room a signal identifying worker wearing the helmet, so that the control room can identify the worker without receiving any message from the worker.

It is another object of the invention to provide a work helmet which does not hinder usual operation of a worker wearing the helmet.

It is still another object of the invention to provide a work helmet which can always send a signal by means of which the control room can detect a position of a worker wearing the helmet.

According to the invention, a work helmet for effecting an intercommunication between workers as well as between a central control room and workers comprises
a cap-like main body made of hard material;
means comprising a light-receiving element provided in said main body for receiving an incoming light signal modulated with an incoming speech signal;
means for demodulating the incoming speech signal and reproducing audibly the demodulated incoming speech signal;
transmitting means comprising at least one light-emitting element provided in said main body for emitting an outgoing light signal modulated with an outgoing speech signal;
means for converting worker's voice into said outgoing speech signal; and
means for generating a helmet identifying signal with which said outgoing light signal or a separate outgoing light signal is always modulated.

DESCRIPTION OF THE PREFERRED EMBODIMENTS

Figure 1A:
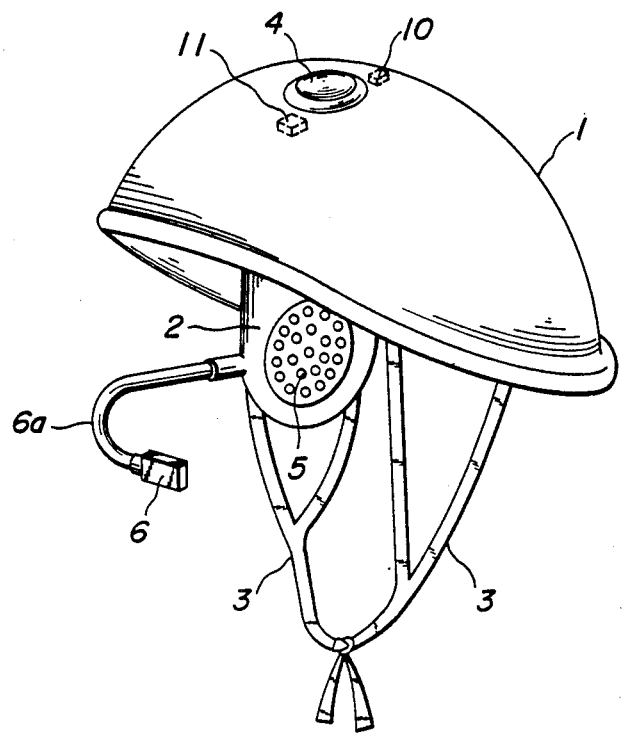
FIGS. 1A and 1B are perspective views showing one embodiment of the work helmet according to the invention.
Figure 1B:
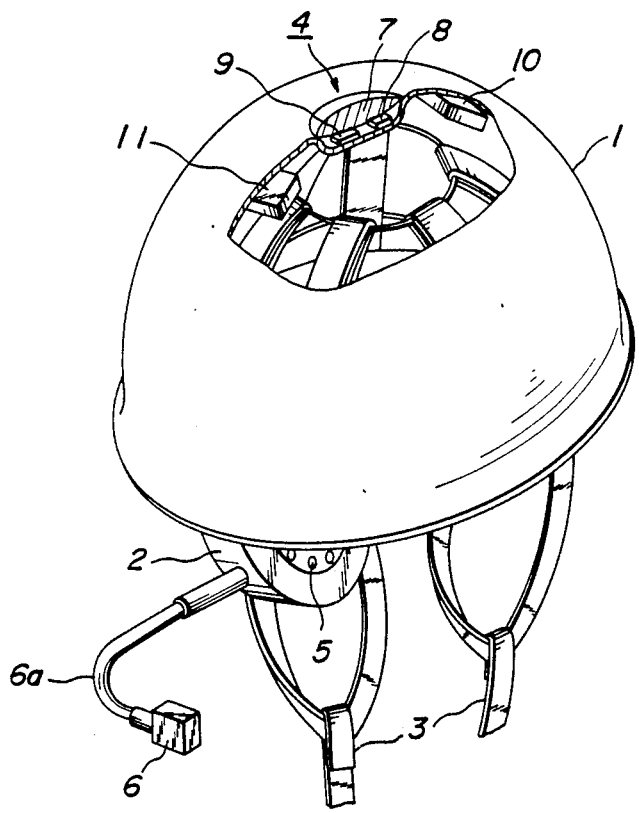

FIGS. 1A and 1B are perspective views showing one embodiment of the work helmet according to the invention. In FIG. 1A, a reference numeral 1 denotes a helmet main body made of hard material for protecting a head of worker. On one side wall of the main body 1 is provided an ear pad portion 2 for covering one ear of worker. Moreover, a reference numeral 3 denotes jaw strings, and a reference numeral 4 represents a light transmitter-receiver arranged near a top portion of the helmet main body 1, which functions to transmit an outgoing light signal upwardly and to receive an incoming light signal emitted from a light transmitter provided on, for instance ceiling. Further, an earphone 5 is arranged inside the ear pad portion 2 and a microphone 6 is provided in front of the mouth of worker via a flexible member 6a whose one end is secured to a front end of the ear pad portion 2.

Figure 2:
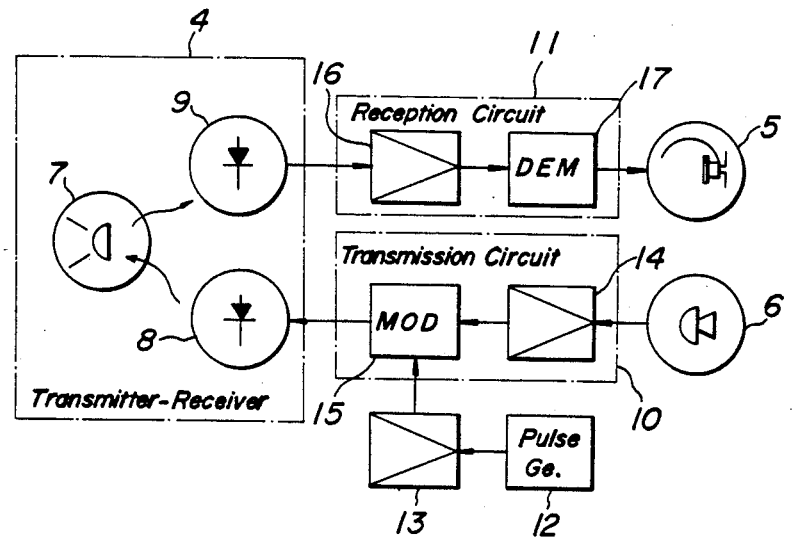
FIG. 2 is a block diagram illustrating a circuit construction of the embodiment shown in FIG. 1.

FIG. 2 is a block diagram showing a circuit construction of the helmet according to the invention. As shown in FIG. 2, the light transmitter-receiver 4 comprises a lens 7, and a light-emitting element 8 such as a light-emitting diode and a light-receiving element 9 such as a photodiode. In the present embodiment, the light-emitting and receiving elements 8 and 9 are arranged on both sides of an optical axis of the lens 7 as illustrated in FIG. 1B. That is to say, the single lens 7 is commonly used for both the elements 8 and 9. The light emitting element 8 is connected to a transmission circuit 10 and the light-receiving element 9 is connected to a reception circuit 11. The transmission circuit 10 comprises an amplifier 14 for amplifying an outgoing speech signal supplied from the microphone 6 and a modulator 15 for modulating a carrier with the amplified outgoing speech signal. In the present embodiment, the carrier is obtained from a pulse generator 12 having a frequency specific to the relevant helmet and an amplifier 13. The carrier may have a frequency of, for instance 100 KHz and may be modulated with the outgoing speech signal in accordance with amplitude modulation, frequency modulation or pulse modulation. When there is produced no outgoing speech signal, only the carrier is supplied to the light-emitting element 8 to produce an outgoing light signal modulated only with the carrier. Contrary to this, when the outgoing speech signal is supplied from the amplifier 14, the carrier modulated with the speech signal is supplied to the light-emitting element 8 which radiates an outgoing light signal modulated in accordance with the modulated carrier. In this manner, according to the invention, the light-emitting element 8 radiates always the outgoing light signal through the lens 7, and therefore at the central control room it is possible to know at least the existence of the worker by detecting the carrier in the outgoing light signal. Further, when the carrier frequencies of respective helmets are made different from each other, it is also possible to identify particular workers by detecting the frequency of carrier.

The incoming light signal is received by the light-receiving element 9 and is converted into an incoming electric signal which is then amplified by an amplifier 16 provided in the reception circuit 11. Usually the incoming light signal contains the modulated speech signal, and thus the incoming electric signal is demodulated by a demodulator 17 in the reception circuit 11 to produce an incoming speech signal. The speech signal thus demodulated is supplied to the earphone 5 and is converted into audible sound. In this manner the message sent from the central control room and other workers can be audibly reproduced by the work helmet according to the invention.

In the embodiment so far explained, the transmission and reception circuits 10 and 11 are so constructed that they process the analog signals, but it is possible to construct them to handle the digital signals. In this case an A/D converter may be arranged between the amplifier 14 and the modulator 15 to convert the analog speech signal into a digital speech signal and a D/A converter may be arranged between the demodulator 17 and the earphone 5. In such a digital circuit arrangement, it is possible to convert the speech signal into the light signal and vice versa at a higher S/N.

Figure 3:
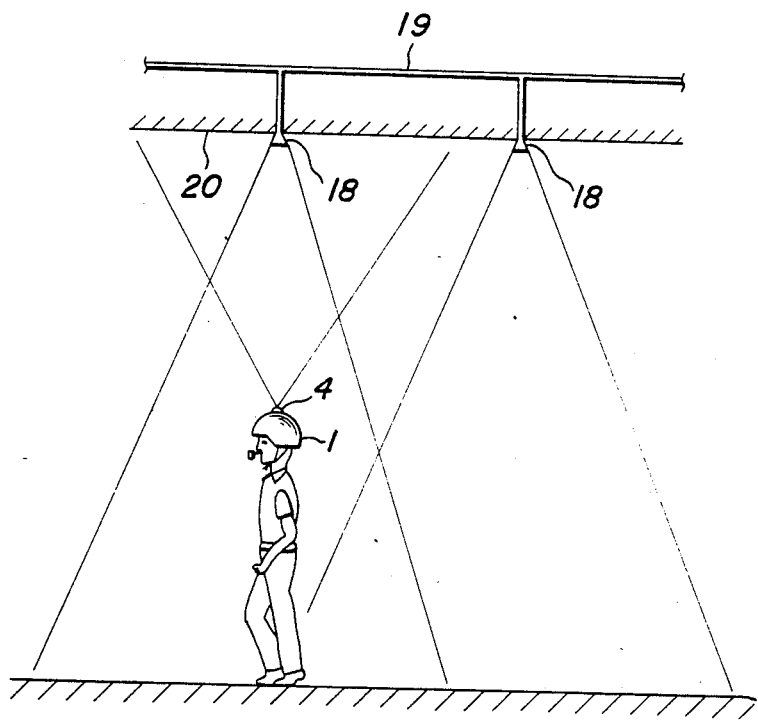
FIG. 3 is a schematic view depicting a using condition of the helmet according to the invention.

FIG. 3 is a schematic view showing a using condition of the helmet according to the invention. As shown in FIG. 3, a plurality of fixed transmitter-receivers 18 which function to receive the light signal emitted from the light transmitter-receiver 4 arranged on the work helmet 1 and to emit the light signal to the light transmitter-receiver 4 are arranged on a ceiling 20 of the construction such as the underground substation in which the workers wearing the helmets according to the invention are working. The construction is divided into a number of sections and in each sections are arranged respective fixed transmitter-receivers 18 in such a manner that there is formed no dead space in which intercommunication between the helmet and fixed transmitter-receiver 18 could never be effected. Moreover, each fixed transmitter-receiver 18 is connected to the central control room through an electrical or optical fiber cable 19 extended along the ceiling 20 of construction.

As explained above, the helmet according to the invention always radiates the light signal having a frequency specific to a worker which wearing the helmet, and therefore the light signal is always received by any one of the fixed transmitter-receivers 18. In this manner, the control room can always recognize at least the existence of the worker in the construction. In this case, when the specific carrier frequencies are made different from each helmets, it is also possible to identify particular workers by detecting or discriminating the carrier frequency.

Further, when particular fixed transmitter-receivers 18 can be identified in the control room, it is possible to detect in which section of the construction the worker is situated. To this end, a plurality of cables may be arranged between each fixed transmitter-receivers 18 and the central control room. Moreover, in case that use is made of the optical fiber cable, the fixed transmitter-receivers 18 may be connected to the optical fiber cable by means of optical couplers. In this case, in order to identify the position of particular fixed transmitter-receivers 18, each transmitter-receiver 18 may include an identification signal specific to respective transmitter-receivers 18 in the construction in the light signal to be transmitted to the control room in a frequency multiplex mode. Further, particular fixed transmitter-receivers 18 may be identified by successively scanning them in a time division multiplex mode.

Figure 4:
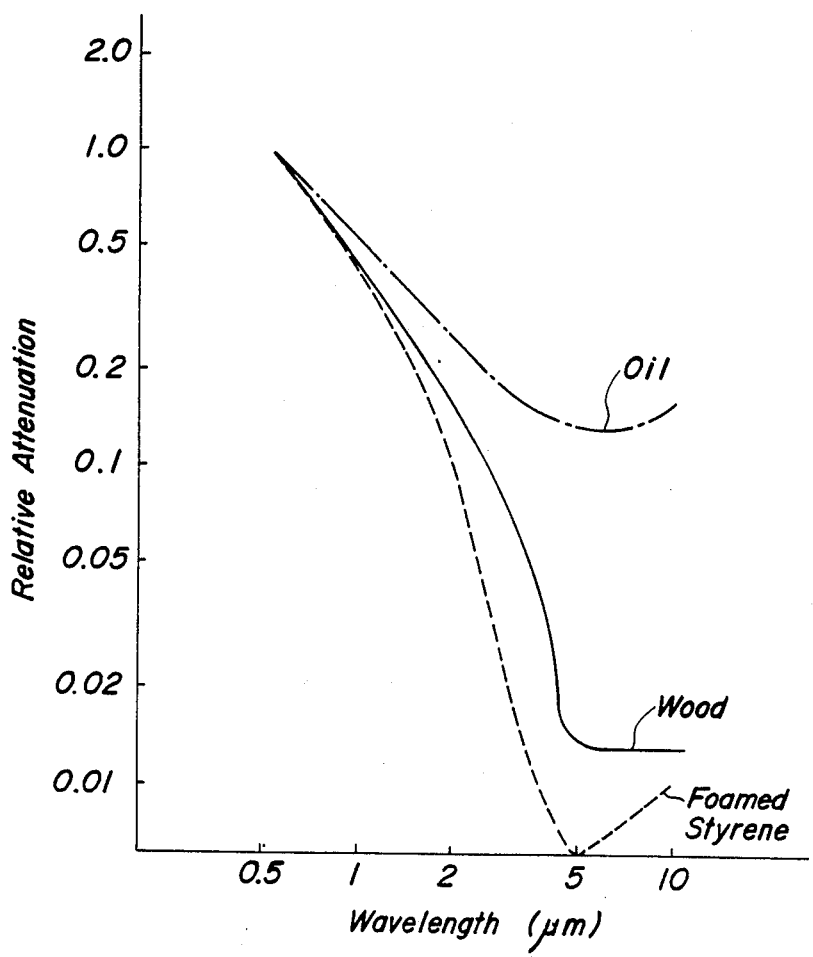
FIG. 4 is a graph showing attenuation characteristics of infrared radiation in smokes of various kinds of materials.

As explained above, by using the work helmet according to the invention, it is possible not only to effect the intercommunication between the workers as well as between the workers and central control room, but also to send the information to the control room that the worker is existent in the construction even if the worker does not send any message to the control room. Further by combining the helmet according to the invention with the suitable fixed transmitter-receivers, the control room can identify particular workers and places in which they are situated. As for the light used in this embodiment, it is possible to use a visible light, but it is preferable to use an infrared light having a wavelength over 800 nm whose transmitivity in smoke is high. Further, as clearly understood from FIG. 4 showing light attenuation characteristics of infrared radiation in smokes of various kinds of materials such as oil, wood and foamed styrene. When use is made of the infrared light having frequency range over 5 $\mu$m whose transmitivity is better than that of 800 nm, it is possible to effect the intercommunication between the worker and the central control room without being influenced by the smoke.

Figure 5:
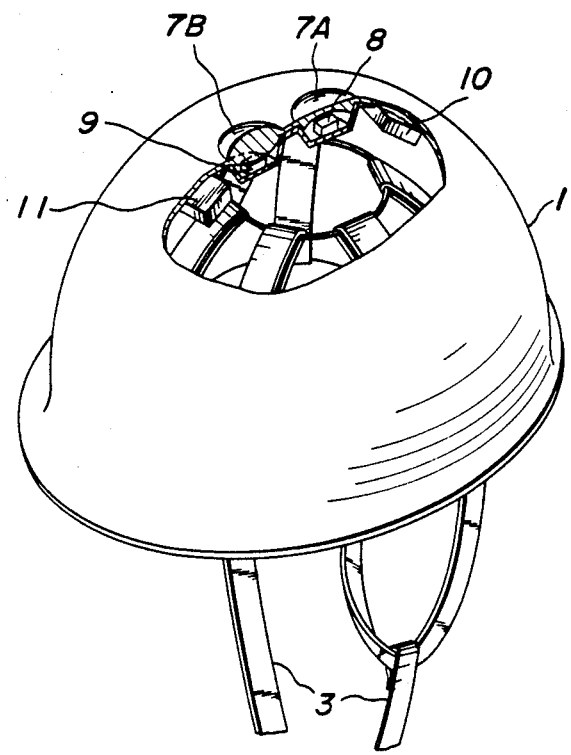
FIG. 5 is a perspective view illustrating another embodiment of the work helmet according to the invention.

In the embodiment mentioned above, the light transmitter-receiver 4 comprises the signal optical lens 7 and a pair of the light-emitting element 8 and the light-receiving element 9, but it is possible to arrange concave and convex lenses 7A and 7B in front of the light-emitting element 8 and the light-receiving element 9, respectively as illustrated in FIG. 5. Further the lens 7 may be dispensed with as a case may be. Especially, if the lens 7 is omitted, a light divergency in transmission or a light receiving region becomes usually narrow, but a light receiving sensitivity is improved, because an intensity of the light becomes large. Moreover, in the embodiment montioned above, the helmet identifying signal is formed by the carrier on which the speech signal is modulated so that the single light emitting element 8 is sufficient for transmitting both the speach signal and helmet identifying signal. However, according to the invention it is also possible to provide a separate light-emitting element for radiating a light signal modulated only with the helmet identifying signal in addition to the light-emitting element 8 for generating the light signal modulated in accordance with the speech signal.

Further, it is possible to incorporate in the jaw string 3 secured to the helmet main body 1 a special microphone having a sensor which detects a vibration of the jaw bone of the worker. In this case, since the microphone is not projected in front of the mouth of the worker, it is convenient to do daily works.

According to the invention, the helmet main body 1 is not different from the known work helmet, and thus a helmet wearing feeling and a head protecting facility are the same as those of the known work helmet. Moreover, since the light transmitter-receiver connected to the transmission circuit 10 and reception circuit 11 is arranged near the top portion of the helmet main body 1, the light signal which includes the helmet identification signal and is always transmitted from the light transmitter-receiver 4 can be effectively received by any one of the fixed transmitter-receivers 18 provided in each light receiving sections even if the worker is located anywhere in the construction. Therefore, the central control room can always known the current positions of the workers in the construction by detecting the helmet identification signal in the light signal and by checking the position of the fixed transmitter-receiver which receives the relevant light signal. In addition, if the disaster such as the fire should occur in the construction, it is possible for the central control room to inform each worker of the guide information most adequate for the emergency escape by taking into consideration the current position of each worker. Further, since such emergency guide information is positively received by the light transmitter-receiver 4 of the work helmet and then the clear speech signal demodulated by the reception circuit 11 is supplied to the earphone 5, while the worker can intercommunicate with the central control room by means of the microphone 6, each worker can escape safely via the most adequate route with the aid of the message from the central control room. Further, the prevention of disaster can be effectively performed by the workers according to circumstances of the disaster.

As clearly understood from the above, according to the invention, since the work helmet always transmits the light signal including the helmet identification signal, the central control room can always know the current positions of each workers, and thus can send to each workers the guide information most adequate for the emergency escape in accordance with the detected current positions of workers. Therefore, it is possible to realize a worker supervising and guiding system which can perform stably the intercommunicate between the workers and central control room. Moreover, since use is made of the light signal for the intercommunication, a complex reflection like an electromagnetic wave can not be generated. Therefore, it is possible to watch the positions of workers stably, and the intercommunication between the workers and central control room can be realized without being affected by the interference. Further, if the fixed transmitter-receiver is connected to the central control room by means of an optical fiber cable, it is not always necessary to arrange in the fixed transmitter-receiver the electric devices for converting the light signal into the electric signal and vice versa. Then, the construction of whole system can be made much simpler while bearing at high temperature.

Therefore, the work helmet according to the invention can play a great role for securing the safely of the workers in the underground substation, etc., and contributes to a development of industry.

What is claimed is:

1. A work helmet for effecting an intercommunication among workers as well as between a central control room and workers, comprising:
    a cap-like main body comprising a hard material and having at least one hole provided near a top portion thereof;
    at least one means for forming at least one cavity having a wall portion and a bottom portion provided in alignment with said at least one hole of said cap-like main body;
    at least one lens provided in said hole;
    a light-receiving means provided on said bottom portion, and a demodulating means for demodulating said light signal received by said light receiving means and audibly reproducing the demodulated incoming speech signal; and
    transmitting means for transmitting a signal, comprising a helmet identifying signal generating means having an oscillator for generating a carrier, converting means for converting voice into an electric signal, said converting means including a microphone, modulating means for modulating said carrier with said electric signal to generate an outgoing signal, and at least one light-emitting means for emitting an outgoing light signal in response to said outgoing signal through said at least one lens, said light-emitting means being provided on said bottom portion.

2. The work helmet of claim 1, wherein one lens and one cavity forming means are integral with said cap-like main body.

3. The work helmet of claim 1, wherein said at least one lens includes a first lens and a second lens, which are integral with said cap-like main body and a further means for forming at least one cavity, said first lens for diverging the outgoing light signal and being arranged in front of the light-emitting element provided on the bottom portion of said at least one cavity forming means, and said second lens for converging the incoming light signal and being arranged in front of the light-receiving element provided on the bottom portion of said at least one further cavity forming means.

4. The work helmet of claim 1, wherein said light-emitting means comprises an element which generates infrared radiation.

5. The work helmet of claim 1, wherein the frequency of said carrier is specific to the work helmet.

6. A work helmet of claim 5, wherein said at least one lens comprises a first lens arranged in the main body in front of the light-emitting means for diverging the outgoing light signal, and a second lens arranged in front of the light-receiving means for converging the incoming light signal.

7. The work helmet of claim 5, wherein said reproducing means comprises an earphone arranged in an ear pad portion secured to said main body.

8. The work helmet of claim 7, wherein said microphone is secured to a free end of a flexible tube-like member whose other end is secured to said ear pad portion.

9. The work helmet of claim 5, wherein said light-emitting element is formed by an element which generates infrared radiation.

10. A work helmet according to claim 9, wherein said infrared radiation has a wavelength longer than 5 μm.

* * * * *